Patented Apr. 23, 1940

2,198,236

UNITED STATES PATENT OFFICE 2,198,236

PREPARATION OF DIALKYL ACETYLENES

Thomas H. Vaughn, Niagara Falls, N. Y., assignor to Carbide and Carbon Chemicals Corporation, a corporation of New York No Drawing. Application December 9, 1936, Serial No. 114,928

16 Claims. (Cl. 260—678)

This invention relates to the preparation of dialkyl acetylenes; and it involves reacting a primary alkyl halide or sulfate upon an alkali metal carbide, preferably in the presence of a diluent for the reactants. The dialkyl acetylene thus produced then is separated from the unreacted components by suitable procedure, as hereinafter described.

According to one preferred form of the invention, an alkali metal carbide in finely-divided form is suspended in a solvent for the alkyl halide or sulfate used. To this suspension is then added the alkyl halide or sulfate with agitation of the mixture. The resultant reaction mixture may be treated with water to decompose excess reactants; and this mixture may be filtered, if necessary. The mixture, or the filtrate,—either with or without a purification treatment as hereinafter described,—is fractionally distilled under suitable conditions for isolation of the dialkyl acetylene present therein.

The solvent employed may be one that is inert to the reactances,—for example, ethers such as diamyl ether, ethylbutyl Carbitol, and dibutyl ether; and hydrocarbons, such as mineral oil distillates boiling around 200° C. Anhydrous liquid ammonia preferably is employed as the solvent, in the interest of high yields, particularly when an alkyl halide is reacted with the alkali metal carbide. Liquid ammonia however reacts to some extent with alkyl halides and sulfates to form amines and ammonium halides and sulfates which then act to decompose some of the carbide and form acetylene. When using liquid ammonia as the solvent, reaction with both alkyl halides and sulfates may be conducted at temperatures ranging from the boiling point of liquid ammonia (—34° C.) to room temperature and higher,—with a corresponding pressure range from atmospheric to several hundred pounds per square inch. At the low temperatures loss of alkyl halide by reaction with liquid ammonia is minimized.

When inert solvents such as ethers and hydrocarbons are used, temperatures ranging from below the boiling point of the solvent at atmospheric pressure to around 300° C. may be employed. The reaction may be conducted under either atmospheric or superatmospheric pressure.

When employing diethyl sulfate and an alkali metal carbide in an inert solvent, it is desirable to employ a reaction temperature above around 170° C., and a solvent boiling at or above this temperature. When a low boiling solvent such as diisopropyl ether is used, the reaction preferably is conducted under superatmospheric pressure, and at a temperature substantially above the boiling point of the solvent at such pressure.

In the practice of that modification of the invention using high-boiling solvents, the dialkyl acetylenes can be distilled from the reaction mixture as rapidly as formed during the course of the reaction. Thus, a very satisfactory yield of diethyl acetylene was obtained by adding diethyl sulfate dropwise to a suspension of finely-divided crude sodium carbide in ethyl butyl Carbitol, while maintaining the reaction mixture at approximately 180° C. A steam-cooled condenser and a liquid ammonia-cooled condenser, arranged in series served as successive condensers for the products. The condensate from the steam-cooled condenser was returned to the reaction mixture.

In practicing the modification of the invention employing a dialkyl sulfate, the reaction may be conducted in the absence of a solvent with satisfactory yields of the dialkyl acetylenes. When reacting sodium carbide and diethyl sulfate in the absence of a solvent, the sulfate preferably is added very slowly to the carbide in an autoclave having its vapor outlet in communication with a series of condensers consisting respectively of a steam-cooled condenser and a second condenser cooled with cold water or with a low temperature refrigerant such as liquid ammonia. The reaction may be conducted at between 170° and 180° C.; and the vapors may be continuously removed to the condensers as rapidly as formed, if desired.

The rate of addition of a primary alkyl halide to the alkali metal carbide in liquid ammonia or other solvent has little effect upon the yield of dialkyl acetylene produced. However, in reactions involving such carbide and dialkyl sulfates, the latter should be added slowly, to prevent the reaction from becoming uncontrollable with the resultant decomposition of the carbide and dialkyl sulfate.

Only primary alkyl halides and sulfates,—which do not contain a side chain on the carbon atom adjacent to the halogen or sulfate group,—may be used for the preparation of dialkyl acetylenes by reaction with an alkali metal carbide such as sodium carbide. Other alkyl esters are desaturated with the formation of alkenes.

The following examples serve to illustrate the invention:

Example 1

One hundred and fifty-seven grams of finely-divided sodium carbide was suspended in 3 liters of liquid ammonia, and was treated with 485 grams of amyl chloride in a steel autoclave, the temperature being allowed to rise to 25° C. while stirring the mixture. After 3 hours, the pressure due to the ammonia was released, and the autoclave product was hydrolyzed by the addition of an excess of water. Two layers that formed were separated. The upper layer was washed with 200 cc. of a 10% aqueous solution of dilute HCl followed with water to remove amines, and then was fractionally distilled under vacuum. The acid converts any amines present into amine hydrochlorides, the latter of which are removed by the water wash. A yield of 155 grams of pure diamyl acetylene boiling at 90° C. under 8 mm. of mercury absolute pressure was obtained, corresponding to a yield of 42%, based on the carbide used.

The alkali metal carbide used need not be pure. Thus the crude product secured by the treatment of calcium carbide with various alkali metal compounds may be used. The crude sodium carbide, as recited in Examples 2 to 5, as a rule contains from 25% to 40% of sodium carbide, the remainder being principally calcium oxide, together with smaller amounts of sodium monoxide and carbon, and sometimes traces of metallic sodium.

Example 2

To 724 grams of a mixture obtained by interaction of calcium carbide and sodium oxide, (and containing 29% of sodium carbide), suspended in 5 liters of liquid ammonia, were added 650 grams of amyl chloride as in Example 1. After stirring for 3 hours, the pressure was released, and the mixture was hydrolyzed with an excess of water and allowed to stand overnight. The mixture was filtered, and the filtrate which consisted of two layers was separated and the upper layer treated as in Example 1. On fractional distillation, under vacuum, 329 grams of diamyl acetylene, boiling at 96° C. under 11 mm. of mercury absolute pressure were obtained, corresponding to a yield of 66% on the basis of the sodium carbide present. Residual diamyl acetylene in the filter cake from the filtration was recovered by leaching the cake with diethyl ether, and recovering the diamyl acetylene from the resultant solution.

Example 3

To 300 grams of crude sodium carbide, containing 32.3% of sodium carbide, suspended in 2 liters of liquid ammonia, vigorously agitated, was added 616 grams of diethyl sulfate slowly during 1 hour. After standing for 2 additional hours, the mixture was hydrolyzed with 1200 cc. of water. This mixture then was distilled under atmospheric pressure to a temperature of 100° C. The distillate which consisted of two layers was separated, and the upper layer was washed first with dilute HCl and then with water. It was then dried over $CaCl_2$. On refractionation under atmospheric pressure, a yield of diethyl acetylene corresponding to 26% of the theoretical was collected boiling between 79° and 83° C.

Example 4

To 500 grams of crude sodium carbide containing 2.5 mols of sodium carbide and suspended in 300 cc. of anhydrous diamyl ether, during vigorous agitation, were added dropwise 3.6 mols of diethyl sulfate, while adjusting the temperature of the reaction mixture to produce refluxing thereof. As the last of the diethyl sulfate was added, the reaction mixture set to a solid mass. The reaction vessel then was connected with a condenser and its contents distilled under atmospheric pressure. Upon fractionating this crude distillate under atmospheric pressure, 67.5 grams of pure diethyl acetylene were obtained as a fraction boiling between 79° and 83° C. By washing lower fractions boiling between 39° and 78° C. with an equal volume of 50% sulfuric acid at 0° C. to remove by-product diethyl ether present in that fraction, a sufficient amount of diethyl acetylene was obtained to raise the total yield to 37%. Substantial amounts of monoethyl acetylene concurrently were produced.

Example 5

One-half mol of sodium carbide was suspended in 75 cc. of ethyl butyl Carbitol, and the suspension was heated to around the boiling point of the said ether (ethyl butyl Carbitol),—i. e. approximately 180° to 200° C. During agitation of the heated mixture, 1 mol of diethyl sulfate was added in small successive portions while continuing the heating. During addition of the diethyl sulfate, a gas consisting principally of ethylene was evolved. The reaction mixture was then treated in the manner described in Example 4. Upon distillation of the mixture, and fractionation of the distillate, 16.4 grams of diethyl acetylene boiling between 79° and 83° C. under atmospheric pressure were obtained, corresponding to a 40% yield. By working up the intermediate fractions boiling between 30° and 70° C. by washing with 50° sulfuric acid in the manner described in Example 4, the yield was increased to 45%, based upon the sodium carbide present in the starting material.

Other alkali metal carbides, such as potassium carbide and lithium carbide also may be used in the process of the invention in the general manner described.

The expression "primary alkyl ester," and similar terms appearing in the claims, are intended to designate alkyl esters derived from, or corresponding to, primary aliphatic alcohols, and which esters do not contain a side chain on the carbon atom adjacent to the functional group.

The expression "volatile solvent" is used in the claims to define solvents which are inert to the reactants,—such as alkyl ethers and hydrocarbons,—and also ammonia, the latter of which is reactive with the alkyl halides and sulfates employed.

The separation of dialkyl and monoalkyl acetylenes from the dialkyl ether formed in the process may be effected with sulfuric acid, or less effectively with phosphoric acid. (See Example 4.) It is necessary to adjust the acid concentration to effect most satisfactorily the separation of various ether and alkyl acetylene mixtures. Thus, while 50% sulfuric acid is satisfactory for the separation of diethyl ether from either ethyl or diethyl acetylene, a sulfuric acid concentration of approximately 65% to 70% is necessary for satisfactory separation of propyl ethers and propyl acetylenes; a sulfuric acid concentration of around 80% is needed for the suitable separation of dibutyl ether and the butyl acetylenes; and a sulfuric acid concentration of between 80% and 100% may be used for separating diamyl ether from the amyl acetylenes. The smaller the amount of ether in the mixture, the smaller the volume of the acid necessary. Generally phosphoric acid, when used, is required in greater concentrations than the sulfuric acid which is preferred. It is preferable to employ low temperatures for the treatment, since in general, in order to secure a given separation, the higher the temperature employed, the higher the concentration of acid needed.

While it is preferred to employ in the practice of the invention an alkali metal carbide that is in finely-divided form, in the interest of securing high yields of dialkyl acetylenes, it is of course possible to use coarse sizes of such carbide and secure good yields of the desired product, particularly when using liquid ammonia.

The invention is susceptible of modification within the scope of the appended claims.

I claim:

1. Process for producing a dialkyl acetylene, which comprises reacting an alkali metal carbide with successive small portions of a dialkyl sulfate while intimately intermixing the carbide and sulfate, and recovering from the reaction mixture the dialkyl acetylene thus produced.

2. Process for producing a dialkyl acetylene, which comprises heating and reacting a finely-divided alkali metal carbide with successive small portions of a dialkyl sulfate while intimately intermixing the carbide and sulfate, distilling vaporous products including dialkyl acetylene from the reaction mixture as rapidly as formed, and separately recovering the dialkyl acetylene from the said products.

3. Process for producing a dialkyl acetylene, which comprises reacting an alkali metal carbide with a compound selected from the group consisting of primary alkyl halides and dialkyl sulfates, in the presence of a volatile solvent for the said compound, and separately recovering the dialkyl acetylene thus produced.

4. Process for producing a dialkyl acetylene, which comprises intimately intermixing and reacting a primary alkyl ester having in its structure at least one functional group selected from the class consisting of halogen groups and the sulfate group, and a finely-divided suspension of an alkali metal carbide in a volatile solvent for the said ester at a temperature above the boiling point of the solvent at atmospheric pressure, and recovering from the resultant reaction mixture the dialkyl acetylene thus produced.

5. Process for producing a dialkyl acetylene, which comprises quickly and intimately intermixing and reacting successive small portions of a primary alkyl ester having in its structure at least one functional group selected from the class consisting of halogen groups and the sulfate group, and a finely-divided suspension of an alkali metal carbide in a volatile organic solvent for the said ester, said reaction being conducted at a temperature above the boiling point of the solvent, and recovering from the resultant reaction mixture the dialkyl acetylene thus produced.

6. Process for producing a dialkyl acetylene, which comprises quickly and intimately intermixing and reacting under superatmospheric pressure successive small portions of a primary alkyl ester having in its structure at least one functional group selected from the class consisting of halogen groups and the sulfate group, and a finely-divided suspension of an alkali metal carbide in liquid ammonia, at a temperature between about −34° C. and room temperature, and recovering from the resultant reaction mixture the dialkyl acetylene thus produced.

7. Process for producing a dialkyl acetylene, which comprises intimately intermixing and reacting a primary alkyl ester selected from the group consisting of alkyl halides and dialkyl sulfates with a finely-divided suspension of an alkali metal carbide in a high boiling organic solvent for the ester which is inert to the carbide and ester, and recovering from the resultant reaction mixture the dialkyl acetylene thus produced.

8. Process for producing a dialkyl acetylene, which comprises intimately intermixing and reacting under superatmospheric pressure a primary alkyl ester selected from the group consisting of alkyl halides and dialkyl sulfates with a finely-divided suspension of an alkali metal carbide in liquid ammonia, and recovering from the resultant reaction mixture the dialkyl acetylene thus produced.

9. Process for producing a dialkyl acetylene, which comprises reacting a compound selected from the group consisting of primary alkyl halides and dialkyl sulfates, with an alkali metal carbide in a high-boiling volatile solvent for the said compound, quickly removing the vapors containing the resultant dialkyl acetylene from the reaction zone as rapidly as formed, and thereafter separately recovering the dialkyl acetylene.

10. Process for producing a dialkyl acetylene, which comprises reacting under superatmospheric pressure a compound selected from the group consisting of primary alkyl halides and dialkyl sulfates with finely-divided sodium carbide in suspension in an inert low-boiling voltaile solvent for the said compound, and recovering the dialkyl acetylene thus produced.

11. Process for producing a dialkyl acetylene, which comprises reacting successive portions of a primary dialkyl sulfate with finely-divided sodium carbide in suspension in a high-boiling solvent for the said sulfate which is inert to the reactants, and recovering the dialkyl acetylene thus produced.

12. Process for producing a dialkyl acetylene, which comprises reacting under superatmospheric pressure a compound selected from the group consisting of primary alkyl halides and dialkyl sulfates with finely-divided sodium carbide in suspension in liquid ammonia at a temperature above the boiling point of the latter at atmospheric pressure, and recovering the dialkyl acetylene thus produced.

13. Process for producing a dialkyl acetylene, which comprises reacting a crude alkali metal carbide and a dialkyl sulfate in the presence of an organic solvent which is inert to the reactants, thereby producing a liquid mixture containing a dialkyl acetylene and a dialkyl ether, treating the said liquid mixture with an aqueous solution of an acid selected from the group consisting of sulfuric acid and phosphoric acid, and separating the said solution from the thus purified dialkyl acetylene.

14. Process for producing a dialkyl acetylene, which comprises heating and reacting a crude alkali metal carbide with a compound selected from the group consisting of primary alkyl halides and dialkyl sulfates, in the presence of a volatile organic solvent for the said compound, thereby producing a liquid mixture containing a dialkyl acetylene and a dialkyl ether, treating the said liquid mixture with an aqueous solution of an acid selected from the group consisting of sulfuric acid and phosphoric acid and containing at least 50% of said acid, and separating the said solution from the thus purified dialkyl acetylene.

15. In the process of producing diethyl acetylene from crude sodium carbide, wherein a liquid mixture containing diethyl acetylene and diethyl ether is formed, the step of separating the said ether from the diethyl acetylene which comprises treating the said liquid mixture with a dilute aqueous solution of sulfuric acid at a temperature around 0° C., and separating the said solution from the thus purified diethyl acetylene.

16. Process for producing a dialkyl acetylene, which comprises reacting a dialkyl sulfate with an alkali metal carbide in a volatile solvent for the said sulfate which is inert to the reactants, and recovering from the resultant reaction mixture the dialkyl acetylene thus produced.

THOMAS H. VAUGHN.